United States Patent
Hatano et al.

(10) Patent No.: US 10,810,002 B2
(45) Date of Patent: Oct. 20, 2020

(54) ELECTRONIC DEVICE, UPDATE PROGRAM CONFIRMATION METHOD AND NON-TRANSITORY COMPUTER-READABLE STORAGE MEDIUM

(71) Applicant: TOSHIBA CLIENT SOLUTIONS CO., LTD., Koto-ku, Tokyo (JP)

(72) Inventors: Yuichi Hatano, Tokyo (JP); Taisuke Furuya, Tokyo (JP); Akemi Kayama, Tokyo (JP)

(73) Assignee: TOSHIBA CLIENT SOLUTIONS CO., LTD., Tokyo (JP)

( * ) Notice: Subject to any disclaimer, the term of this patent is extended or adjusted under 35 U.S.C. 154(b) by 0 days.

(21) Appl. No.: 16/232,947

(22) Filed: Dec. 26, 2018

(65) Prior Publication Data

US 2020/0042304 A1    Feb. 6, 2020

(30) Foreign Application Priority Data

Jul. 31, 2018  (JP) .................................. 2018-143727

(51) Int. Cl.
*G06F 8/65*    (2018.01)
*G06F 7/58*    (2006.01)

(52) U.S. Cl.
CPC .  *G06F 8/65* (2013.01); *G06F 7/58* (2013.01)

(58) Field of Classification Search
CPC ...................................................... G06F 3/123
See application file for complete search history.

(56) References Cited

U.S. PATENT DOCUMENTS

| 2013/0145013 A1* | 6/2013 | Murakami | H04L 41/00 709/223 |
| 2015/0040114 A1 | 2/2015 | Miyama et al. | |
| 2016/0019048 A1* | 1/2016 | Tsuboi | G06F 3/123 717/168 |

FOREIGN PATENT DOCUMENTS

| JP | 5378456 B2 | 12/2013 |
| JP | 6167736 B2 | 7/2017 |

* cited by examiner

*Primary Examiner* — Lewis A Bullock, Jr.
*Assistant Examiner* — Mohammad H Kabir
(74) *Attorney, Agent, or Firm* — Knobbe, Martens, Olson & Bear, LLP

(57) ABSTRACT

According to one embodiment, an electronic device includes a policy acquirer, a random number generator and a confirmation time determination processor. The policy acquirer acquires policy information indicating a common storage area storing an update program, and a time period in which presence or absence of the update program in the common storage area is to be confirmed. The random number generator generates a random number. The confirmation time determination processor creates a plurality of candidate times by dividing the time period by a predetermined time unit, and determines a confirmation time at which presence or absence of the update program is to be confirmed by selecting one of the plurality of candidate times using the random number.

9 Claims, 6 Drawing Sheets

FIG. 7

ELECTRONIC DEVICE, UPDATE PROGRAM CONFIRMATION METHOD AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2018-143727, filed Jul. 31, 2018, the entire contents of which are incorporated herein by reference.

FIELD

Embodiments described herein relate generally to an electronic device, an update program confirmation method and a non-transitory computer-readable storage medium.

BACKGROUND

In recent years, a system for integrally managing a large number of personal computers (PC) used by staff members for business operations in, for example, a firm, is variously utilized. As one of main functions of this kind of system, a function of managing version upgrade of a program installed into a PC which is an object to be managed exists.

Version upgrade of a program is carried out by executing an update program distributed from a distribution source of the program by a PC into which the program is installed. For example, utilization in which a system administrator who receives distribution of an update program stores the received update program in a file server connected to a Local Area Network (LAN), periodically confirms whether or not an update program to be applied to each PC exists in the file server and, when such an update program exists, acquires the update program to thereby execute the program, is conceivable.

In the case of such utilization, access occurs from each PC to the file server, and hence there is a need to disperse the access in order that the LAN may not be congested. Heretofore, such dispersion of access has been controlled by an operation management server assuming the operation management of each PC. That is, in order to carry out such dispersion of access, existence of the operation management server assuming the operation management of each PC has been essential.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic device includes a policy acquirer, a random number generator and a confirmation time determination processor. The policy acquirer acquires policy information including first information and second information. The first information indicates a common storage area storing an update program. The second information indicates a time period in which presence or absence of the update program in the common storage area is to be confirmed. The random number generator generates a random number. The confirmation time determination processor creates a plurality of candidate times at which presence or absence of the update program is to be confirmed by dividing the time period by a predetermined time unit, and determines a confirmation time at which presence or absence of the update program is to be confirmed by selecting one of the plurality of candidate times using the random number.

Figure 1:
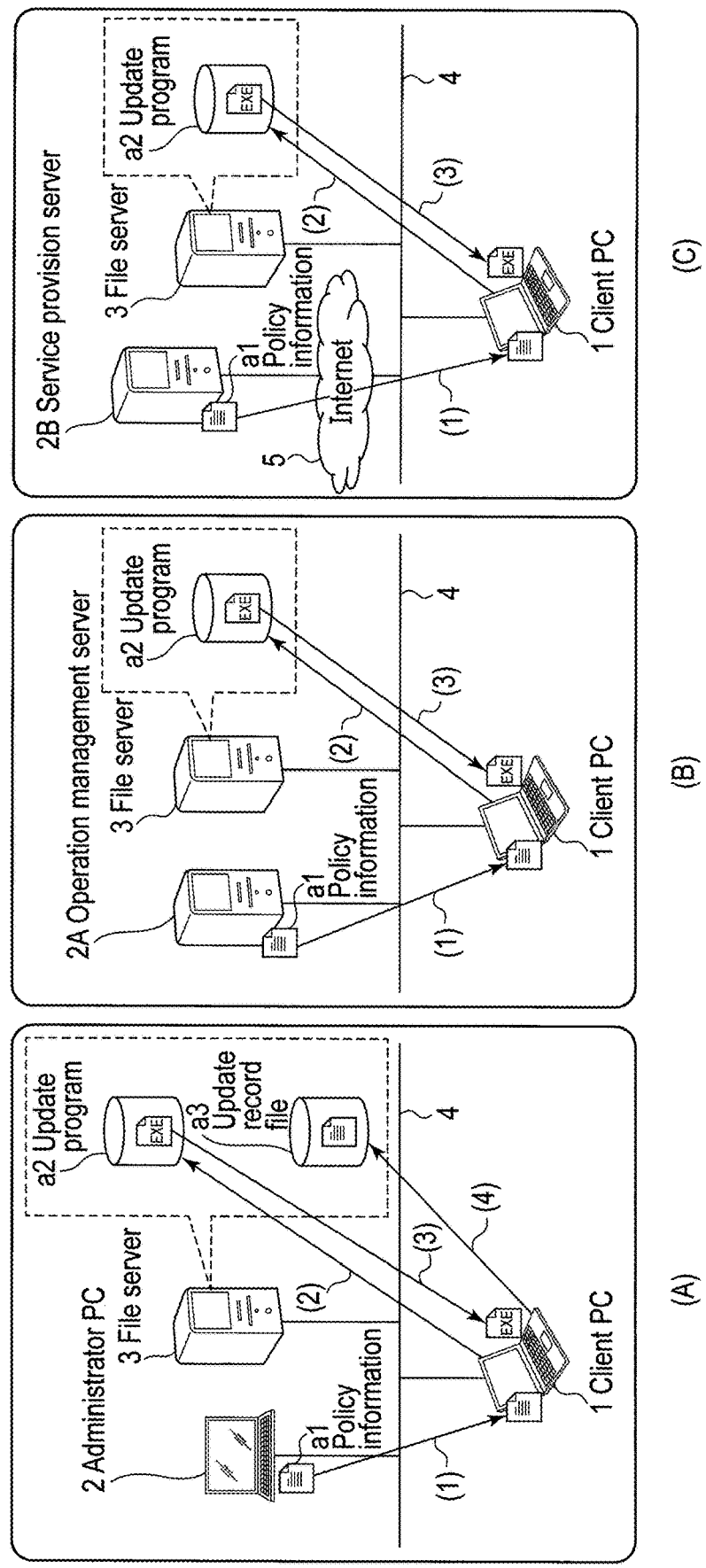
FIG. 1 is an exemplary view showing some examples of operating environments in which an electronic device of an embodiment can be placed.

FIG. 1 is an exemplary view showing some examples of operating environments in which an electronic device (client PC) 1 of the embodiment can be placed. The client PC 1 is, for example, a PC of which usage is granted to the staff members by the firm.

Here, it is assumed that security software (program) which encrypts data to be written by the client PC 1 to the storage and which decrypts the encrypted data read from the storage is installed into the client PC1, in order not to leak out information inside the client PC 1, even if the client PC 1 is taken away by an outsider, for example. When an application program operating on the client PC 1 into which the security software is installed intends to write data to the storage, the data is encrypted and written to the storage with the application program not being conscious of the encryption. When the application program intends to read the data from the storage, the encrypted data read from the storage is decrypted without the application program being conscious of the decryption. This security software operates only when the valid (registered) user is authenticated at the time of logon. The storage is not limited to the storage inside the client PC 1 and, for example, a storage externally connected to the client PC 1 through a Universal Serial Bus (USB) connector can also be made an applicable object.

The operation management including version upgrade of the security software installed into the client PC 1 is, broadly speaking, classified into three forms of (A), (B), and (C) as shown in FIG. 1. It should be noted that in FIG. 1, although in each of (A), (B), and (C), one client PC 1 is shown, client PCs 1 exist in large numbers.

The form (A) is a form in which a server (operation management server) for operation management of the security software is not provided, (B) is a form in which a server (operation management server 2A) is provided in a firm into which the security software is introduced, and the server is connected to a LAN 4, and (C) is a form in which a server (service provision server 2B) of a provider providing operation management service of security software is utilized through the Internet 5.

In the case of the form of (A), for example, a system administrator acquires an update program on the basis of release information from a distribution source of security software, and stores the update program into a predetermined folder in a predetermined storage under the command of a file server 3, the predetermined folder being a common storage area accessible to all the client PCs 1 through the LAN 4. In the case of the form of each of (B) and (C), for example, an administrator of the operation management server 2A or the service provision server 2B acquires an update program on the basis of release information from a distribution source of security software, and stores the update program into a predetermined folder in a predetermined storage under the command of a file server 3.

When placed in the operating environment in any one of the forms (A) through (C), the client PC 1 receives policy information (a1) sent from the administrator PC 2, operation management server 2A or service provision server 2B (FIG. 1: (1)), and periodically executes access (FIG. 1: (2)) for confirming presence/absence of an update program (a2) to the file server 3 on the basis of the policy information. Here, it is assumed that the above operation is executed as daily processing. In the policy information, at least information indicating the predetermined folder in the predetermined storage under the command of the file server 3, the predetermined folder storing the update program, and information indicating a time period (from start time to finish time) in which presence/absence of an update program is to be confirmed are included. Regarding the policy information, for example, one policy information item common to all the client PCs 1 may be prepared, or, a plurality of policy information items may be prepared for each section or department.

When an update program exists, the client PC 1 acquires the update program from the file server 3 (FIG. 1: (3)), and executes the update program. Thereby, version upgrade of the security software is completed. In the case of the form of (A), when the version upgrade of the security software is completed, the client PC 1 records that purport (fact) into an update record file (a3) stored in the predetermined folder in the predetermined storage under the file server 3 (FIG. 1: (4)). The system administrator refers to the update record file whereby the administrator can confirm, for example, which of the client PCs 1 has completed a version upgrade of the security software. It should be noted that presence/absence of execution of recording in the update record file can be switched by the policy information. In the case of the form of (B) or (C), information indicating the client PCs 1 which have executed access to the folder in which the update program is stored, the information being recorded in the file server 3, is acquired by the operation management server 2A or the service provision server 2B, and, which of the client PCs 1 has completed a version upgrade of the security software is managed.

As shown in FIG. 1, in the case of any one of the forms (A) through (C), at the time for confirmation regarding presence/absence of the update program, access from the client PC 1 to the file server 3 occurs. Accordingly, there is a need to disperse the access in order that the LAN 4 may not be congested. Thus, the electronic device (client PC) 1 of this embodiment is a device provided with a contrivance configured to operate in such a manner as to disperse the timings of confirming presence/absence of the update program, and, hereinafter this point will be described in detail.

Figure 2:
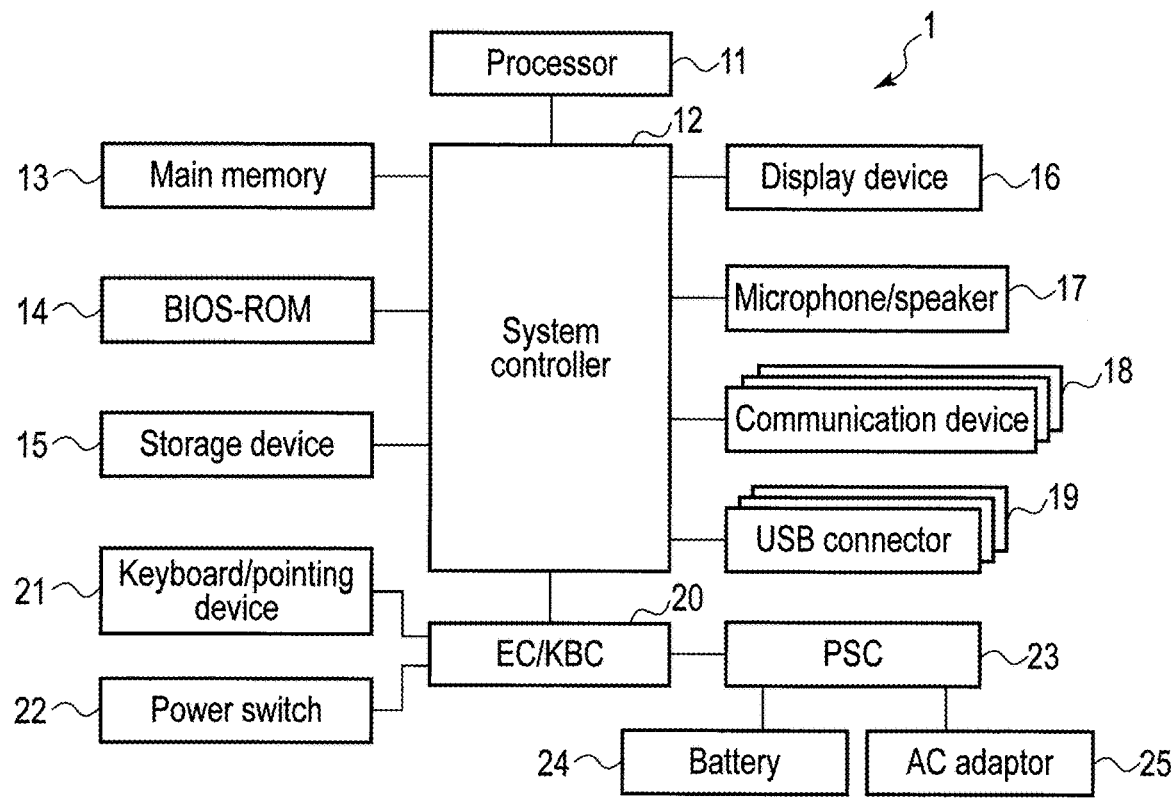
FIG. 2 is an exemplary view showing an example of a hardware configuration of the electronic device of the embodiment.

FIG. 2 is an exemplary view showing an example of a hardware configuration of the client PC 1. As shown in FIG. 2, the client PC 1 includes a processor 11, a system controller 12, a main memory 13, a basic input/output system (BIOS)-ROM 14, and a storage device 15. Further, the client PC 1 includes a display device 16, a microphone/speaker 17, a communication device 18, a USB connector 19, and an embedded controller (EC)/keyboard controller (KBC) 20. Furthermore, the client PC 1 includes a keyboard/pointing device 21, a power switch 22, a power supply controller (PSC) 23, a battery 24, and an AC adaptor 25.

The processor 11 is a device configured to control each component in the client PC 1, and loads various programs stored in the storage device 15 into the main memory 13 and executes the programs to make the client PC 1 execute various kinds of processing. In the various programs, an operating system (OS), and application programs operating under the control of the OS, are included. The aforementioned security software is one of the application programs. The security software is installed into the client PC 1 as a resident program. Further, the processor 11 executes the BIOS stored in the BIOS-ROM 14.

The main memory 13 is a storage utilized as a main memory of the client PC 1 such as a DRAM or the like. The BIOS-ROM 14 is a storage storing the BIOS and various environment settings in a rewritable manner such as an EEPROM or the like. The storage device 15 is a storage utilized as an external memory of the client PC 1 such as a solid state drive (SSD) or the like.

The system controller 12 is a device interconnecting the components in the client PC 1. Further, the system controller 12 incorporates therein various controllers such as a controller configured to control access to, for example, the main memory 13, the BIOS-ROM 14, and the storage device 15, a controller configured to control image display on the display device 16, a controller configured to control input/output of a sound through the microphone/speaker 17, a controller configured to control communication with an external device through the communication device 18, a controller configured to control communication with a USB device connected to the USB connector 19, and the like.

The display device 16 is a device assuming the output of a user interface provided by the client PC 1, and displays a display screen drawn by the processor 11. The microphone/speaker 17 is a device configured to input/output a sound. The communication device 18 is a device configured to execute, for example, communication with an external device (administrator PC 2, operation management server 2A, service provision server 2B, file server 3, etc.) shown in FIG. 1 through the LAN 4 or Internet 5. The USB connector 19 is a coupling unit capable of freely attaching/detaching a USB device such as a USB memory or the like.

The EC/KBC 20 is firstly a controller configured to accept data input carried out by the keyboard/pointing device 21 serving as a device assuming input of the user interface provided by the client PC 1. Further, the EC/KBC 20 is secondly a controller configured to control power-on/power-off of the client PC 1 according to an operation of the power switch 22 in cooperation with the PSC 23.

The PSC 23 is a controller configured to create and supply electric power for operating the components of the client PC 1 by using electric power from the battery 24 or the AC adaptor 25. The PSC 23 also controls charge/discharge of the battery 24. When there is no supply of electric power from the AC adaptor 25, the PSC 23 discharges the battery 24 to thereby create the operating electric power of the components by using the electric power from the battery 24. When there is supply of electric power from the AC adaptor 25, the PSC 23 creates the electric power for operating the components by using the electric power from the AC adaptor 25, and charges the battery 24 by using the electric power from the AC adaptor 25. It should be noted that the PSC 23 operates even while the client PC 1 is in a power-off state, and continuously executes supply of the electric power to the EC/KBC 20.

Figure 3:
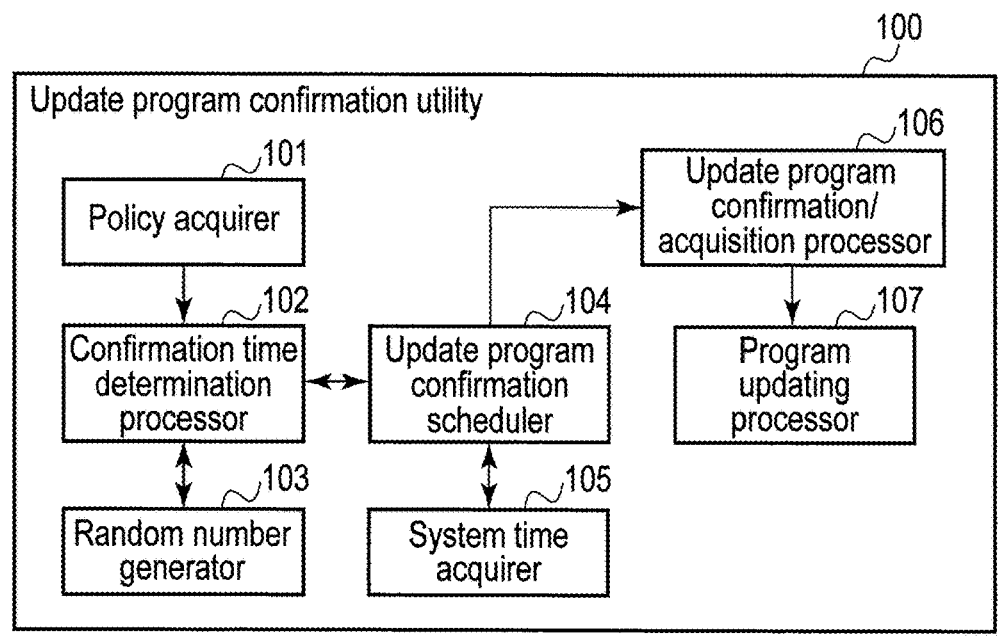
FIG. 3 is an exemplary view showing an example of a functional block of an update program confirmation utility operating on the electronic device of the embodiment.

FIG. 3 is an exemplary view showing an example of a functional block of an update program confirmation utility (program) 100 operating on the client PC 1 having the above-mentioned hardware configuration, which carries out confirmation regarding presence/absence of an update program.

The update program confirmation utility 100 may exist as one module of the aforementioned security software or may exist as a separate program to be provided concomitantly with the security software. By execution of the update program confirmation utility 100, processing sections shown in FIG. 3 including a policy acquirer 101, a confirmation time determination processor 102, a random number generator 103, an update program confirmation scheduler 104, a system time acquirer 105, an update program confirmation/acquisition processor 106, and a program updating processor 107, are constructed on the client PC 1. When the update program confirmation utility 100 exists as a program separate from the security software, the update program confirmation utility 100 is also installed into the client PC 1 as a resident program.

Figure 4:
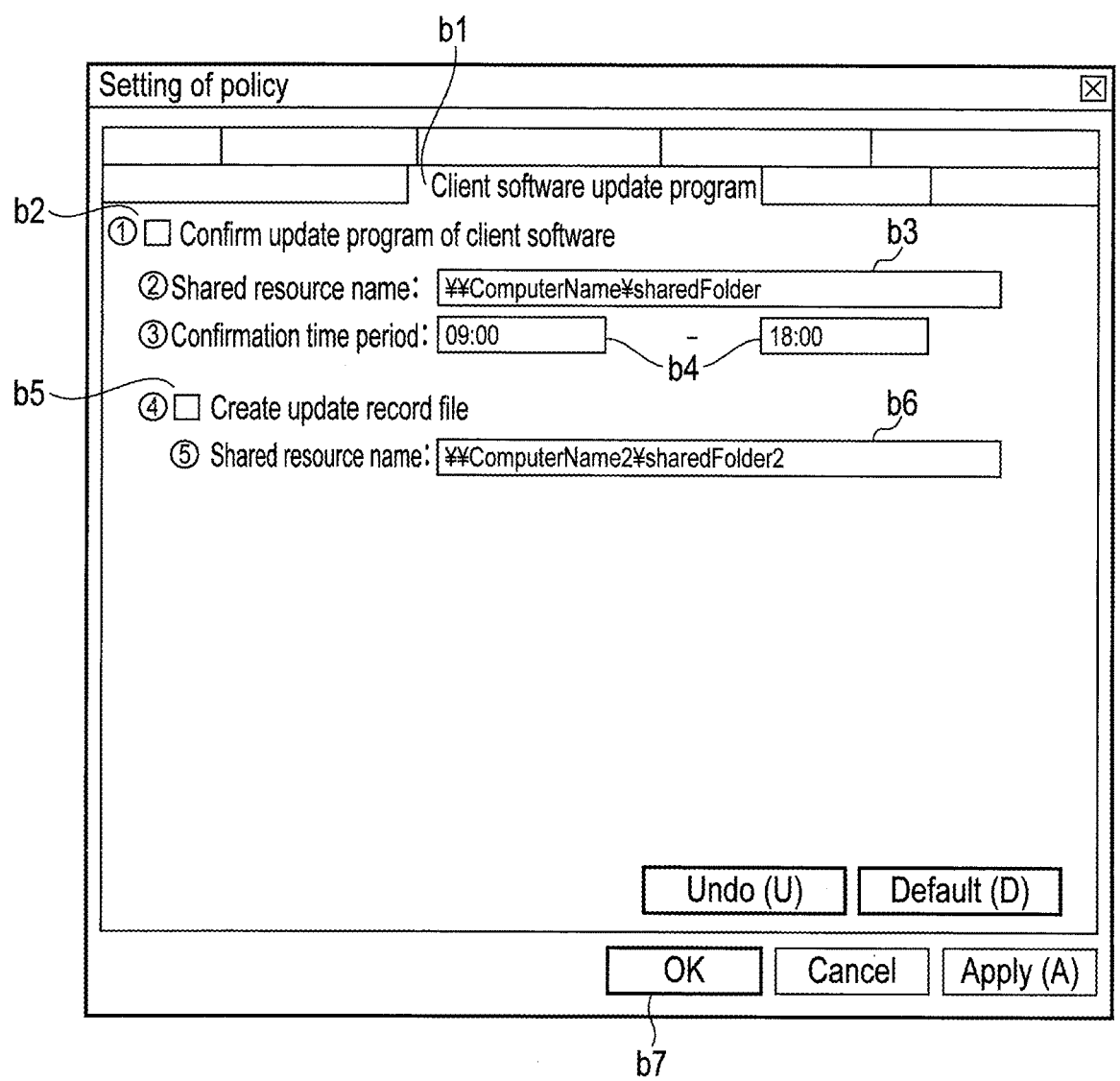
FIG. 4 is an exemplary view showing an example of a setting screen of policy information used by the update program confirmation utility operating on the electronic device of the embodiment.

The policy acquirer 101 receives policy information sent from the administrator PC 2, the operation management server 2A, or the service provision server 2B. In the case of the form of (A) shown in FIG. 1, a utility (program) to prepare the policy information is installed into the administrator PC 2. FIG. 4 is an exemplary view showing an example of a setting screen of policy information to be displayed on the administrator PC 2 by the utility.

As shown in FIG. 4, on a policy information setting screen, a client software update program tag indicated by a symbol b1 is arranged. The system administrator, by selecting the client software update program tag b1, can display a screen to carry out setting associated with confirmation regarding presence/absence of the update program to be carried out by the client PC 1. FIG. 4 shows an example of the policy information setting screen in the case where the client software update program tag b1 is selected.

On the policy information setting screen displayed when the client software update program tag b1 is selected, as shown in FIG. 4, first, a check box indicated by a symbol b2 is arranged. When making the client PC 1 execute periodical confirmation regarding presence/absence of the update program, the system administrator makes the check box b2 set on. When the check box is made the check box b2 set off, the periodical confirmation regarding presence/absence of the update program to be carried out by the client PC 1 is not executed.

Further, on the policy information setting screen, an input field b3 used to input a pass (shared resource name) of the folder in which the update program is stored is arranged.

Furthermore, on the policy information setting screen, an input field b4 used to input a time period (from start time to finish time) in which presence/absence of the update program is to be confirmed is arranged. For example, "9:00 to 18:00" is set as a default value of the time period.

Further, on the policy information setting screen, a check box indicated by a symbol b5 is arranged. When making the client PC 1 execute recording in the update record file to indicate a version upgrade completion of the security software, the system administrator makes the check box b5 set on. When the check box b5 is set off, recording in the update record file by the client PC 1 is not executed. Further, on the policy information setting screen, an input field b6 used to input a pass (shared resource name) of a folder in which the update record file is prepared is arranged.

When input of the aforementioned items has been carried out and an OK button b7 on the policy information setting screen has been selected, policy information reflecting input of the above items is prepared. The prepared policy information is distributed from the administrator PC 2 to the client PCs 1. As the distribution method of the policy information, various conventional methods can be applied. Here, it is assumed that the policy information to be distributed to the client PCs 1 indicates that at least confirmation regarding presence/absence of the update program is to be executed.

Returning to FIG. 3, description of the processing modules constructed on the client PC 1 by the update program confirmation utility 100 will be continued.

The confirmation time determination processor 102 uses a random number generated by the random number generator 103 to determine the time at which confirmation regarding presence/absence of the update program is to be executed, on the basis of the policy information acquired by the policy acquirer 101. As described previously, in the policy information, the time period in which presence/absence of the update program is to be confirmed is shown. The confirmation time determination processor 102 determines the time at which confirmation regarding presence/absence of the update program is to be executed within a range of this time period. A determination rule thereof will be described below with reference to FIG. 5. It should be noted that the random number generator 103 generates a random number by using, for example, BCryptGenRandom API or the like which is a function to be used when a random number are generated by using a PC.

Figure 5:
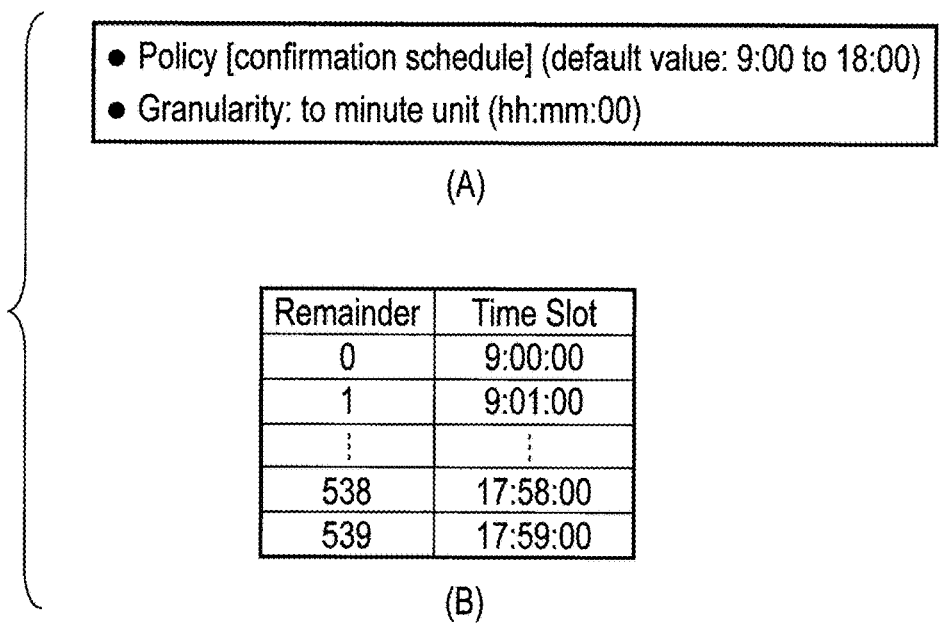
FIG. 5 is an exemplary view for explaining a rule of determining the time for confirmation regarding presence/absence of an update program to be carried out by the update program confirmation utility operating on the electronic device of the embodiment.

It is assumed that as shown in (A) of FIG. 5, in the policy information, for example, 9:00 to 18:00 of a default value is shown as a time period in which presence/absence of the update program is to be confirmed. Further, here, it is assumed that a minute unit is set as a granularity (time unit) by which the time period is divided. This set value of the granularity may be a value retained by the update program confirmation utility 100 as a fixed value or may be a value given as a parameter at the time of startup of the update program confirmation utility 100.

In the case of 9:00 to 18:00, there exist 540 one-minute time slots such as 9:01:00, . . . , 17:58:00 from 9:00:00 to 17:59:00. The confirmation time determination processor 102 uses the random number to select one of the 540 time slots in order that operations of access to the file server 3 for confirmation regarding presence/absence of the update program may not overlap with each other to the utmost among all the client PCs 1, and determines the selected one time slot as the time for confirmation regarding presence/absence of the update program.

More specifically, the generated random number is divided by the number of time slots existing in the time period indicated by the policy information, and the confirmation time is determined on the basis of a remainder value of the division. For example, in the case of 9:00 to 18:00, as shown in (B) of FIG. 5, the 540 time slots are assigned to values 0 to 539 each of which can be acquired as the remainder value in a one-to-one relationship. For example, when 1 is obtained as the remainder value, the confirmation time determination processor 102 determines the time to confirm presence/absence of the update program as 9:01:00.

Namely, each of the large number of client PCs 1 receiving policy information from the administrator PC 2 divides the time period (indicated by the policy information) by a predetermined granularity to create a plurality of candidate times, and selects any one from the candidate times by using the random number. As a result, it is possible to disperse the operations of access to the file server 3 for confirmation regarding presence/absence of the update program among the large number of client PCs 1.

Returning to FIG. 3, description of the processing module constructed on the client PC 1 by the update program confirmation utility 100 will be continued.

The update program confirmation scheduler 104 uses the confirmation time determined by the confirmation time determination processor 102 to schedule the expected date and time to confirm presence/absence of an update program. When the scheduled expected date and time have come, the update program confirmation scheduler 104 requests the update program confirmation/acquisition processor 106 to execute confirmation regarding presence/absence of an update program. The update program confirmation scheduler 104 uses, for example, a system time acquired by the system time acquirer 105 to determine whether or not the scheduled expected date and time have come. The system time acquirer 105 uses, for example, a function for acquiring the system time to acquire the system time of the client PC 1. It should be noted that the update program confirmation scheduler 104 may by itself use the function to acquire the system time. That is, the update program confirmation scheduler 104 may be provided with the function of the system time acquirer 105.

For example, when the confirmation regarding presence/absence of an update program has been executed by the update program confirmation/acquisition processor 106, if the confirmation time has been determined as 9:01:00, the update program confirmation scheduler 104 schedules the expected date and time so that confirmation regarding presence/absence of an update program may be executed by the update program confirmation/acquisition processor 106 at 9:01:00 of the next day. Scheduling of the expected date and time by the update program confirmation scheduler 104 is executed irrespective of success or failure of the confirmation regarding presence/absence of an update program carried out by the update program confirmation/acquisition processor 106.

The update program confirmation/acquisition processor 106 confirms whether or not an update program exists in a predetermined folder in a predetermined storage under control of the file server 3, on the basis of the pass (shared resource name) indicated by the policy information. When the update program exists in the folder, the update program confirmation/acquisition processor 106 acquires the update program from the file server 3. The program updating processor 107 executes the update program (acquired by the update program confirmation/acquisition processor 106) to update the security software.

Incidentally, if the time at which the power to the client PC 1 is turned on is a time after the expected date and time (scheduled by the update program confirmation scheduler 104) has already passed, in general, confirmation regarding presence/absence of an update program is executed by the update program confirmation/acquisition processor 106 at that point in time. In the case of such specifications, at the starting time on the first working day just after a long-term vacation of the whole company such as a summer vacation, a large number of client PCs 1 make access to the file server 3 all at once. Thus, the client PC 1 of this embodiment is further provided with a contrivance to operate in such a manner as to disperse the timings of confirming presence/absence of an update program even under such circumstances. Next, this point will be described below in detail.

At the time of startup of the client PC 1, at the time of return from a sleep or at the time of return from a hibernation, the update program confirmation scheduler 104 executes a comparison between the expected date and time and the system time and, thereafter periodically executes this comparison. The sleep implies a state where the electric power consumption of the client PC 1 is curbed while supply of electric power to the main memory 13 is maintained. The hibernation implies a state where the contents of the main memory 13 are saved into the storage device 15, supply of electric power to the main memory 13 is cut off, and the electric power consumption of the client PC 1 is curbed more than the sleep. When the system time (acquired by the system time acquirer 105) has already passed over the expected date and time (scheduled by the update program confirmation scheduler 104), the scheduler 104 determines whether or not the comparison between the expected date and time and the system time at that time is executed at the time of startup of the client PC 1, at the time of return from a sleep state of the client PC 1, or at the time of return from a hibernation state of the client PC 1. In other words, the scheduler 104 determines whether or not the system time is the time of startup of the client PC 1, the time of return from the sleep state of the client PC 1, or the time of return from the hibernation state of the client PC 1. When the comparison is not executed at the time of startup of the client PC 1, at the time of return from the sleep state of the client PC 1, or at the time of return from the hibernation state of the client PC 1, the update program confirmation scheduler 104 determines that the scheduled expected date and time have come, and executes confirmation of the update program and scheduling of the expected date and time of the next time.

On the other hand, when the comparison is executed at the time of startup of the client PC 1, at the time of return from the sleep state of the client PC 1, or at the time of return from the hibernation state of the client PC 1, the update program confirmation scheduler 104 determines that the scheduled expected date and time have been passed while the PC 1 has been in a power-off state, in the sleep state or in the hibernation state. In this case, the update program confirmation scheduler 104 examines whether or not the system time (hour, minute, second) has already passed over the confirmation time determined by the confirmation time determination processor 102. When the system time has not yet passed over the confirmation time yet, the update program confirmation scheduler 104 schedules the next expected date and time for the confirmation time of that day. The case where the expected date and time have been passed and the system time (hour, minute, second) has not yet passed over the confirmation time is, for example, a case or the like where the client PC 1 which has been powered off at 18:00 two days before is powered on at 11:00 on that day, and the expected date and time have been scheduled for 15:00 (confirmation time) the day before. In this case, the expected date and time are scheduled for 15:00 of that day.

When the system time (hour, minute, second) has already passed over the confirmation time, the update program confirmation scheduler 104 requests the confirmation time determination processor 102 to determine the confirmation time within a range of time from the time obtained by adding a fixed time to the system time to the finish time of the time period indicated by the policy information. At this time, the update program confirmation scheduler 104 uses the confirmation time (determined by the confirmation time determination processor 102) to schedule, on that day, the next expected date and time. The case where the expected date and time have already been passed and the system time (hour, minute, second) has already passed over the confirmation time is, for example, a case or the like where the client PC 1 which has been powered off at 18:00 two days before is powered on at 11:00 on that day, and the expected date and time have been scheduled for 09:30 (confirmation time) of the day before. In this case, the expected date and time are scheduled for the provisional confirmation time of that day provisionally determined by the confirmation time determination processor 102.

As described above, even when the expected date and time have already been passed while the client PC 1 has been in the power-off state, in the sleep state or in the hibernation state, confirmation regarding presence/absence of an update program is not immediately executed at the time of startup of the client PC 1, at the time of return from the sleep state of the client PC 1, or at the time of return from the hibernation state of the client PC 1, and operations of access to the file server 3 can be dispersed.

Further, when confirmation regarding presence/absence of an update program is executed at the provisional expected date and time, the update program confirmation scheduler 104 uses the original confirmation time to schedule the expected date and time on the next day. By using the original confirmation time, the confirmation time of the update program is prevented from gradually shifting backward (gradually shifting to a time later than the original confirmation time).

Thereby, even when a large number of staff members turn on the power to the client PCs 1 after a long-term vacation exceeding a threshold, operations of access from the client PCs 1 to the file server 3 are dispersed. Further, even when the client PCs 1 are powered on later than the confirmation time on that day, presence/absence of an update program is confirmed within that day, and regarding the confirmation, measure is taken in order not to concentrate access to the file server.

Figure 6:
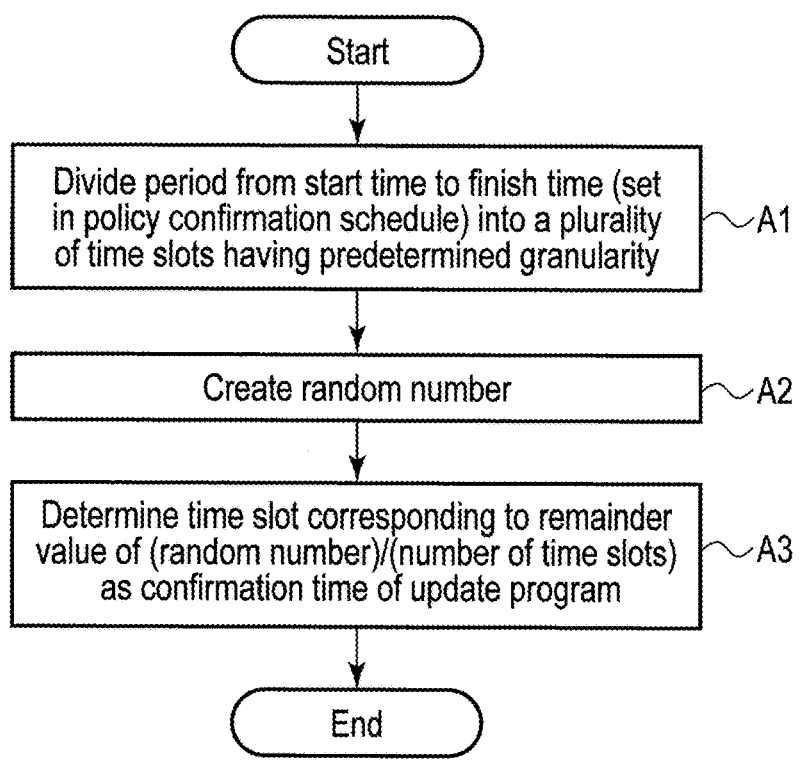
FIG. 6 is an exemplary flowchart showing the operation procedure of the electronic device of the embodiment at the time of update program presence/absence confirmation time determination.

FIG. 6 is an exemplary flowchart showing the operation procedure of the client PC 1 to determine a time for confirmation regarding presence/absence of an update program.

The client PC 1 divides a period from start time to finish time (set in the policy confirmation schedule) into a plurality of time slots having a predetermined granularity (step A1). Further, the client PC 1 creates a random number (step A2). It should be noted that the order of step A1 and step A2 may be reversed, or step A1 and step A2 may be executed in parallel with each other.

Then, the client PC 1 determines a time slot corresponding to a remainder value obtained by dividing the random number by the number of time slots, as a time for confirmation regarding presence/absence of an update program (step A3).

Figure 7:
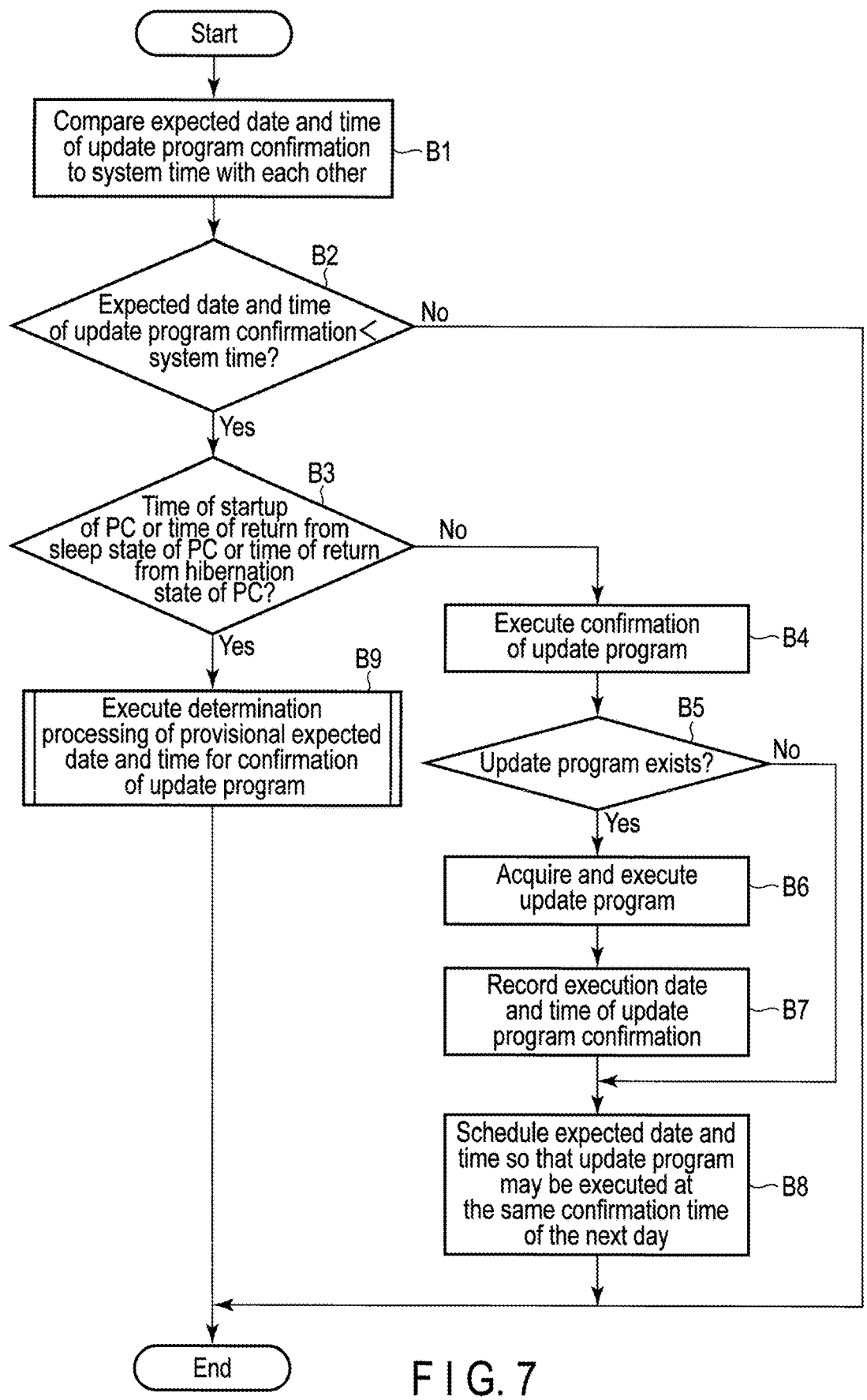
FIG. 7 is an exemplary flowchart showing the operation procedures for update program presence/absence confirmation scheduling and execution timing determination of the electronic device of the embodiment.

FIG. 7 is an exemplary flowchart showing the operation procedures for scheduling presence/absence confirmation of an update program and for determining execution timing of the client PC 1.

First, the client PC 1 compares the expected date and time of update program confirmation to the system time with each other (step B1). When the system time has not yet passed over the expected date and time of update program confirmation (step B2: NO), the client PC 1 terminates determination processing of execution timing of confirmation regarding presence/absence of an update program and other processing at that point in time.

On the other hand, when the system time has already passed over the expected date and time of update program confirmation (step B2: YES), the client PC 1 subsequently determines whether or not this processing is executed at the time of startup of the client PC 1, at the time of return from a sleep state of the client PC 1, or at the time of return from a hibernation state of the client PC 1 (step B3). When the processing is not executed at the time of startup of the client PC 1, at the time of return from the sleep state of the client PC 1, or at the time of return from the hibernation state of the client PC 1 (step B3: NO), the client PC 1 executes confirmation of an update program (step B4).

When the update program exists (step B5: YES), the client PC 1 acquires the update program from the file server 3 to execute the acquired update program (step B6), and records the execution date and time of the update program confirmation into the file server 3 (step B7). The client PC 1 schedules the expected date and time so that confirmation of the update program may be executed at the same confirmation time of the next day (step B8), and terminates the processing.

When the processing is executed at the time of startup of the client PC 1, at the time of return from the sleep state of the client PC 1, or at the time of return from the hibernation state of the client PC 1 (step B3: YES), the client PC 1 executes determination processing of the provisional expected date and time for confirmation of the update program (step B9) (the operation procedure is shown in FIG. 8), and then terminates the processing.

Figure 8:
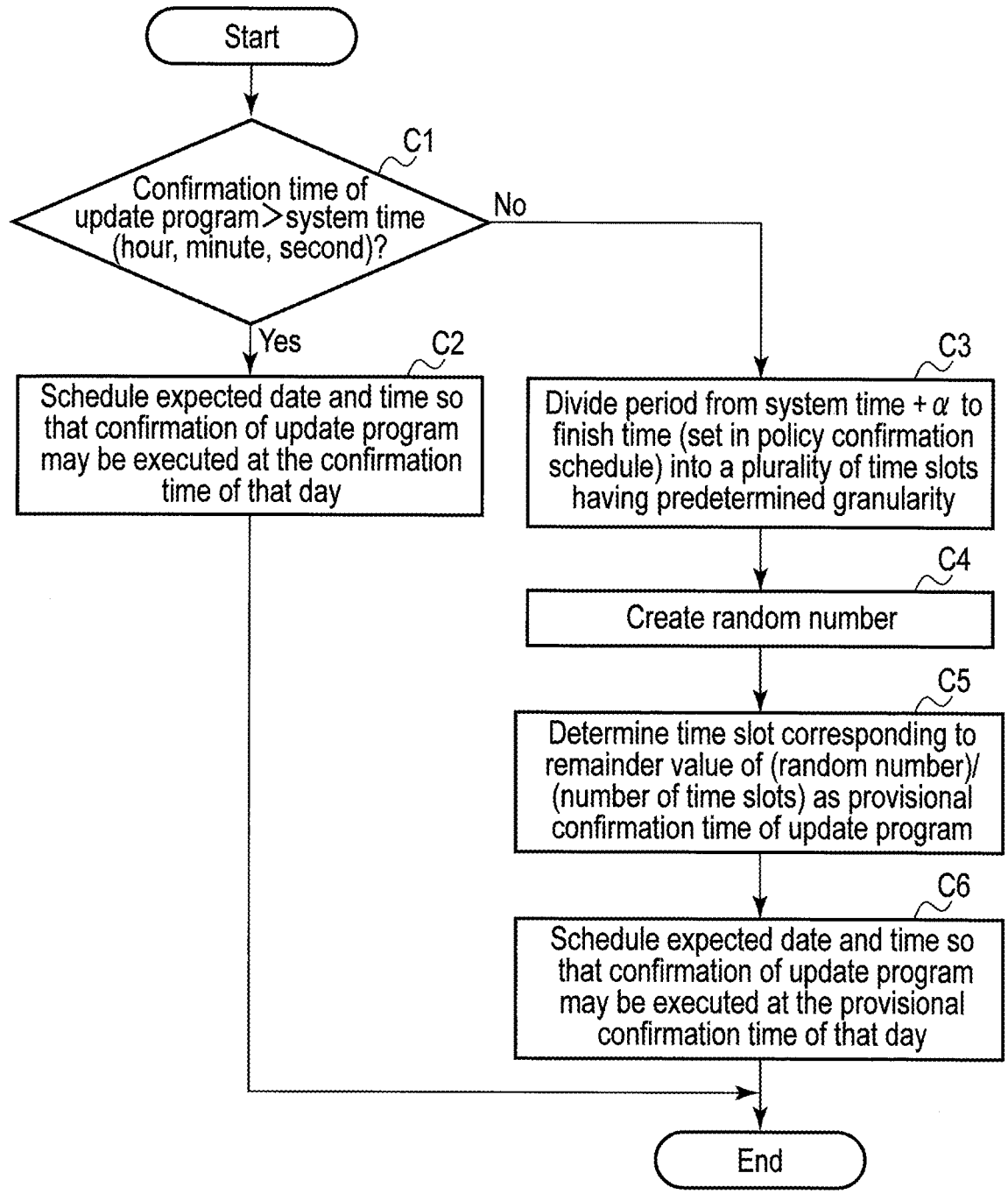
FIG. 8 is an exemplary flowchart showing the operation procedure for determination processing of the provisional expected date and time of update program confirmation of the electronic device of the embodiment.

FIG. 8 is an exemplary flowchart showing the operation procedure for determination processing of the provisional expected date and time for confirmation of the update program.

The client PC 1 determines whether or not the system time (hour, minute, second) is the time before the confirmation time of the update program (step C1). When the system time is the time before the confirmation time of the update program (step C1: YES), the client PC 1 schedules the expected date and time so that confirmation of the update program may be executed at the confirmation time of that day (step C2), and then terminates the processing.

When the system time is the time after the confirmation time of the update program (step C1: NO), the client PC 1 divides a period from the time obtained by adding a fixed time (a) to the system time to the finish time (set in the policy confirmation schedule) into a plurality of time slots having a predetermined granularity (step C3). Further, the client PC 1 creates a random number (step C4). It should be noted that the order of step C3 and step C4 may be reversed, or step C3 and step C4 may be executed in parallel with each other.

Next, the client PC 1 determines a time slot corresponding to a remainder value obtained by dividing the random number by the number of time slots, as a provisional time for confirmation regarding presence/absence of an update program (step C5). Then, the client PC 1 schedules the expected date and time so that confirmation of the update program may be executed at the provisional confirmation time of that day (step C6), and then terminates the processing.

As has been described above, the electronic device (client PC) 1 of this embodiment operates in such a manner as to disperse timings of confirming presence/absence of an update program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a policy acquirer that acquires policy information comprising first information and second information, the first information indicating a common storage area storing an update program, the second information indicating a time period in which presence or absence of the update program in the common storage area is to be confirmed;
   a confirmation time determination processor that creates a plurality of candidate times at which presence or absence of the update program is to be confirmed by dividing the time period indicated by the second information by a predetermined time slot, and determines a confirmation time at which presence or absence of the update program is to be confirmed by selecting one of the plurality of candidate times using a random number; and
   a scheduler that schedules expected date and time at which presence or absence of the update program is to be confirmed, using the confirmation time, wherein,
      when a confirmation regarding presence or absence of the update program has been executed, the scheduler schedules the expected date and time such that the confirmation is executed again at the confirmation time of the next day,
      when a system time of the electronic device has already passed over the expected date and time, the scheduler determines whether the system time is a time of startup of the electronic device, a time of return from a sleep state of the electronic device, or a time of return from a hibernation state of the electronic device, and
      when the system time is the time of startup of the electronic device, the time of return from the sleep state of the electronic device, or the time of return from the hibernation state of the electronic device, the scheduler schedules the expected date and time such that the confirmation is executed at the confirmation time of that day or the next day.

2. The electronic device of claim 1, wherein
   the scheduler determines whether the system time has already passed over the confirmation time, and schedules the expected date and time such that the confirmation is executed at the confirmation time of that day when the system time has not yet passed over the confirmation time.

3. The electronic device of claim 1, wherein,
   when the system time has already passed over the confirmation time, the scheduler requests the confirmation time determination processor to determine the confirmation time within a range of time from a start time obtained by adding a time value to the system time to a finish time of the time period, and schedules the expected date and time such that the confirmation is executed at the confirmation time determined by the confirmation time determination processor by a request of the scheduler.

4. An update program confirmation method executed by an electronic device, the method comprising:
   creating a plurality of candidate times at which presence or absence of an update program is to be confirmed by dividing a time period included in policy information by a predetermined time slot, the policy information comprising first information and second information, the first information indicating a common storage area storing the update program, the second information indicating the time period in which presence or absence of the update program in the common storage area is to be confirmed;
   determining a confirmation time at which presence or absence of the update program is to be confirmed by selecting one of the plurality of candidate times using a random number; and
   scheduling expected date and time at which presence or absence of the update program is to be confirmed, using the confirmation time, wherein the scheduling comprises:
      scheduling, when a confirmation regarding presence or absence of the update program has been executed, the expected date and time such that the confirmation is executed again at the confirmation time of the next day,
      determining, when a system time of the electronic device has already passed over the expected date and time, whether the system time is a time of startup of the electronic device, a time of return from a sleep state of the electronic device, or a time of return from a hibernation state of the electronic device, and
      scheduling, when the system time is the time of startup of the electronic device, the time of return from the sleep state of the electronic device, or the time of return from the hibernation state of the electronic device, the expected date and time such that the confirmation is executed at the confirmation time of that day or the next day.

5. The method of claim 4, wherein the scheduling further comprises
   determining whether the system time has already passed over the confirmation time, and
   scheduling, when the system time has not yet passed over the confirmation time, the expected date and time such that the confirmation is executed at the confirmation time of that day.

6. The method of claim 4, wherein the scheduling further comprises
   requesting, when the system time has already passed over the confirmation time, the electronic device to determine the confirmation time within a range of time from a start time obtained by adding a time value to the system time to a finish time of the time period, and
   scheduling the expected date and time such that the confirmation is executed at the confirmation time determined by the electronic device by the requesting.

7. A non-transitory computer-readable storage medium having a computer program executable by a computer, the computer program controlling the computer to execute functions of:

creating a plurality of candidate times at which presence or absence of an update program is to be confirmed by dividing a time period included in policy information by a predetermined time slot, the policy information comprising first information and second information, the first information indicating a common storage area storing the update program, the second information indicating the time period in which presence or absence of the update program in the common storage area is to be confirmed;

determining a confirmation time at which presence or absence of the update program is to be confirmed by selecting one of the plurality of candidate times using a random number; and scheduling expected date and time at which presence or absence of the update program is to be confirmed, using the confirmation time, wherein the scheduling comprises:

scheduling, when a confirmation regarding presence or absence of the update program has been executed, the expected date and time such that the confirmation is executed again at the confirmation time of the next day, determining, when a system time of the electronic device has already passed over the expected date and time, whether the system time is a time of startup of the computer, a time of return from a sleep state of the computer, or a time of return from a hibernation state of the computer, and scheduling, when the system time is the time of startup of the computer, the time of return from a sleep state of the computer, or the time of return from a hibernation state of the computer, the expected date and time such that the confirmation is executed at the confirmation time of that day or the next day.

8. The storage medium of claim 7, wherein the scheduling further comprises determining whether the system time has already passed over the confirmation time, and scheduling, when the system time has not yet passed over the confirmation time, the expected date and time such that the confirmation is executed at the confirmation time of that day.

9. The storage medium of claim 7, wherein the scheduling further comprises requesting, when the system time has already passed over the confirmation time, the computer to determine the confirmation time within a range of time from a start time obtained by adding a time value to the system time to a finish time of the time period, and scheduling the expected date and time such that the confirmation is executed at the confirmation time determined by the computer by the requesting.

* * * * *